July 23, 1940. J. W. JOHNSON ET AL 2,208,696
METHOD OF TREATING LEATHER
Filed June 1, 1936 5 Sheets-Sheet 1

INVENTORS
Joseph W. Johnson
John J. Brophy
Alexis E. Ushakoff
By their Attorney
Victor Cahn July 23, 1940. J. W. JOHNSON ET AL 2,208,696
METHOD OF TREATING LEATHER
Filed June 1, 1936 5 Sheets-Sheet 2

July 23, 1940.  J. W. JOHNSON ET AL  2,208,696
METHOD OF TREATING LEATHER
Filed June 1, 1936    5 Sheets-Sheet 3

INVENTORS
Joseph W. Johnson
John J. Brophy
Alexis E. Ushakoff
By their attorney
Victor Cole July 23, 1940. J. W. JOHNSON ET AL 2,208,696
METHOD OF TREATING LEATHER
Filed June 1, 1936 5 Sheets-Sheet 4

INVENTORS
Joseph W. Johnson
John J. Brophy
Alexis S. Ushakoff
By their attorney
Victor Coll July 23, 1940.　　J. W. JOHNSON ET AL　　2,208,696
METHOD OF TREATING LEATHER
Filed June 1, 1936　　5 Sheets-Sheet 5

Patented July 23, 1940

2,208,696

UNITED STATES PATENT OFFICE 2,208,696

METHOD OF TREATING LEATHER

Joseph W. Johnson and John J. Brophy, Salem, and Alexis E. Ushakoff, Beverly, Mass., assignors to United Shoe Machinery Corporation, Borough of Flemington, N. J., a corporation of New Jersey Application June 1, 1936, Serial No. 82,744

4 Claims. (Cl. 12—146)

This invention relates to the treatment of leather, and more particularly to the imparting of shape or conformation to leather.

An object of the invention is to provide a method whereby leather may be readily given a shape or conformation which the leather will retain.

Another object is to provide a method of imimparting shape or conformation to leather and which will obviate the necessity for water-tempering and its disadvantages as in the case of normally stiff leathers, or high temperatures as in the plating or embossing of skins or soft leathers.

A further object is to provide a method whereby leather may be rendered temporarily limp or inert so that a predetermined shape or conformation may be imparted thereto which the leather will retain after the period of temporary inertness is over.

Other objects of the invention will be apparent to those skilled in the art from the written disclosures herein made and from the accompanying drawings, in which Figure 1 is a diagrammatic view illustrating one form of apparatus wherein leather may be rendered inert in accordance with this invention;

Figure 1:
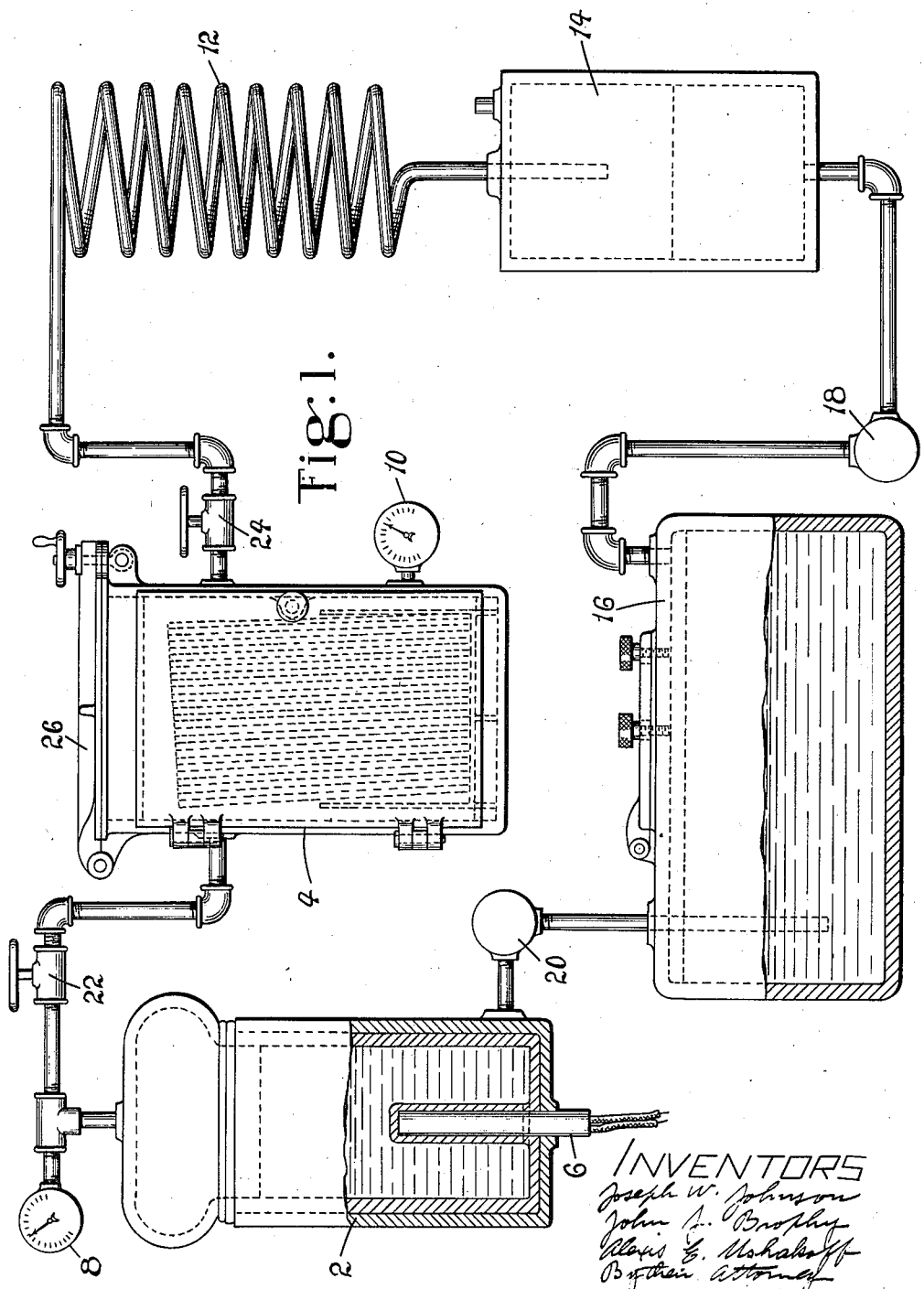

The shaping of stiff and heavy leather by ordinary methods is tedious and time consuming. The leather is first rendered relatively flexible or inert by soaking it in water and allowing the wetted leather to mull. A soaking period of from several minutes to several hours is usually required, followed by a mulling period of from 12 to 48 hours, in order for the water to become uniformly distributed throughout the substance of the leather, and in order to render the leather sufficiently flexible and inert. Thereafter the leather is shaped as in a mold or press and it is usually necessary to maintain the leather in the desired shape in the apparatus until the leather has substantially dried out. The drying out of the leather ordinarily requires another long period of time, a period of 24 to 48 hours being common. In many cases, particularly where imparting the new shape involves bending the leather through a substantial angle, it is necessary to repeat the water-soaking and molding operations in order to cause the leather to retain more or less permanently the new shape to be imparted thereto. A further disadvantage associated with the usual prior art practices of shaping the leather is the well-known fact that water tends to discolor and to stiffen leather. In the shaping of certain articles where color and flexibility are important, additional steps may be required to restore the original flexibility to the leather and to correct discoloration.

By the present invention the necessity for water-soaking the leather to be shaped is eliminated and the time required to shape leather is enormously reduced, and in many cases the pressure required to shape leather is substantially decreased. Furthermore, this invention makes possible the tempering of certain hard and stiff leather which hitherto it has been practically impossible to temper.

Briefly, we have discovered that leather may be quickly rendered entirely inert and limp for short periods of time, such as a few minutes, and without damaging or deteriorating the leather in any way, by subjecting the leather to an atmosphere consisting essentially of the vapor of one or more of certain organic substances at temperatures at least as high as the boiling points of the substances and from room temperature up, but preferably below about 80° C., in order that the leather may not be injured by the heat. In certain instances, the leather may be treated satisfactorily at atmospheric or barometric pressure, but in order to temper the leather quickly, especially in the case of heavy leathers, we prefer to employ pressures of from atmospheric to about 10 pounds gage, that is, 10 pounds per square inch above atmospheric or barometric pressure.

To illustrate our invention specifically, a leather shoe outsole may be placed in a closed container and subjected to the vapor of acetone at a temperature of about 65° C. and a pressure of 2 pounds gage for from 1 to 5 minutes. Upon removal from the container the sole is very limp and may be bent freely in any direction and to any shape, and will remain in any shape imparted to it prior to the dissipation of the vapor. Within 1 or 2 minutes the vapor has been substantially completely dissipated from the leather and the leather resumes its normal characteristics of stiffness and resiliency, but remains in the new shape imparted thereto while the leather was inert.

In order for the vapor to render the leather inert, the leather should contain at least a small percentage of moisture. The normal moisture content of heavy outsole leather varies throughout the year from about 3% to about 18% and leather having a moisture content within this range can generally be rendered inert by subjecting it to the vapor of an organic material in accordance with the principles of this invention. The optimum moisture content for leather that is to be shaped or molded by the instant invention is in the neighborhood of 10%. The addition of some moisture to hard rolled heavy leather initially containing the minimum of moisture is therefore sometimes advantageous. This additional moisture can be incorporated in the leather in any suitable manner, a convenient method being to store the leather for a time under conditions of high humidity. It is to be understood that leather containing up to about 18% of moisture uniformly distributed throughout the material is substantially dry and cannot be distinguished by visual examination from that having a smaller moisture content. Leather having a moisture content near the upper normal limit, namely 18%, is generally more flexible than leather of lower moisture content, but such leather is in no sense inert and cannot easily be formed or molded.

The vapors to which the leather is subjected may consist of one or more organic substances of a large group. The great majority of the vaporizable substances which we have found useful for our invention are included in the group of aliphatic compounds consisting of hydrocarbons, ketones, esters, ethers and alcohols. The term "hydrocarbon" as used in the specification and claims includes halogen-substituted hydrocarbons. The boiling point or vaporizing characteristic of the material is, of course, a limiting factor, for the reason that the vapor must be formed at temperatures sufficiently low to have no deteriorating effect upon the leather. Examples of substances which may be used singly to provide the vapor for treating leather according to this invention are as follows:

| | Boiling point °C. |
|---|---|
| Propylene oxide | 34.1 |
| Acetone | 56.1 |
| Methyl acetate | 56.9 |
| Methyl alcohol | 64.5 |
| Ethyl acetate | 77.4 |
| Ethyl alcohol | 78.5 |

It may be mentioned in this connection that most, if not all, organic solvents for nitrocellulose having a sufficiently low boiling point may be employed for the purpose of this invention.

Another group of substances which we have found satisfactory for the purposes of this invention comprises certain constant boiling point mixtures. Examples of such mixtures are as follows:

| Mol percent | Mol percent | Constant boiling point (approximate) °C. |
|---|---|---|
| 10.5 ethyl alcohol* | +89.5 n-propyl chloride | 45 |
| 51.0 methyl alcohol | +49.0 n-hexane | 51 |
| 30.5 methyl alcohol | +69.5 ethyl formate | 51 |
| 65.0 chloroform* | +35.0 methyl alcohol | 54 |
| 35.0 methyl alcohol | +65.0 methyl acetate | 54 |
| 44.5 carbon tetra-chloride* | +55.5 methyl alcohol | 56 |
| 52.0 methyl alcohol | +48.0 acetone | 56 |
| 61.0 acetone | +39.0 methyl acetate | 56 |
| 81.0 acetone | +19.0 isobutyl chloride | 56 |
| 61.4 methyl alcohol | +38.6 benzene | 58 |
| 84.0 chloroform* | +16.0 ethyl alcohol | 59 |
| 62.0 methyl alcohol* | +38.0 ethylene chloride | 60 |
| 83.0 methyl alcohol | +17.0 n-heptane | 61 |
| 91.7 methyl alcohol | +8.3 ethyl acetate | 62 |
| 61.3 carbon tetra-chloride* | +38.7 ethyl alcohol | 65 |

Of the above examples, those marked with an asterisk (*) are of a fireproof, or substantially fireproof, nature. The acetone and isobutyl chloride mixture, mentioned above, while not fireproof, burns at a retarded rate.

An illustrative apparatus whereby leather may be treated with any of the previously described constant boiling point compositions to render the leather inert is shown diagrammatically in Fig. 1.

The apparatus as illustrated consists essentially of a boiler or evaporator 2 wherein the leather-inerting vapor is produced, and a vapor treatment chamber 4 in which the leather to be inerted is subjected to an atmosphere of the vapor. Heat may be supplied to the evaporator 2 by any suitable means, such as the electric heating element 6. The pressure and temperature within the evaporator or boiler may be controlled by thermostat or other well-known means. Where the inerting material consists of a single compound, such as acetone, or a constant boiling mixture, such as methyl alcohol and acetone, it may be introduced in advance into the boiler because the vapor therefrom will be of constant composition. For continuous operation, the constant boiling mixture may be introduced into the evaporator 2 in any suitable manner, continuously or intermittently. Where, however, the inerting liquid does not form a constant boiling mixture, the constituents of such liquid may be fed separately to the boiler at individually controlled rates through metering pumps or equivalent means (not shown). The boiler 2 and vapor treatment chamber 4 may be provided with pressure gages 8 and 10 to indicate the pressure of the vapor therein. The vapor, after contacting with the leather in the vapor treatment chamber, may be recovered, where constant boiling point mixtures are employed, as would ordinarily be the case, by causing said vapor to pass through a condenser 12 and an air separator 14, and thence into a condensate reservoir 16 from which it may be pumped or otherwise returned to the boiler 2. Pumps 18 and 20 may be utilized to facilitate the condensate transfer and recovery.

In operation the valves 22 and 24 being closed, and the cover 26 of the chamber 4 open, the pieces of leather to be treated are disposed in the chamber and the cover 26 closed. The valve 22 is opened and caused to remain open until the leather has been exposed to the vapor for a sufficient length of time. The valve 24 is left open until the entrance of vapor through valve 22 has substantially displaced air which initially fills the vapor treatment chamber 4 so that the atmosphere in the chamber consists essentially of the organic vapor, whereupon the valve 24 is closed. At the expiration of the treatment time valve 22 is closed, and valve 24 then opened. The leather may then be removed from the chamber and the process repeated.

Leather which has been rendered inert and limp in accordance with this invention may be utilized in various leather shaping processes, illustrative examples of which are given below. These examples, however, by no means exhaust the field of application of this invention and are intended to be illustrative only.

Example I

Figure 2:
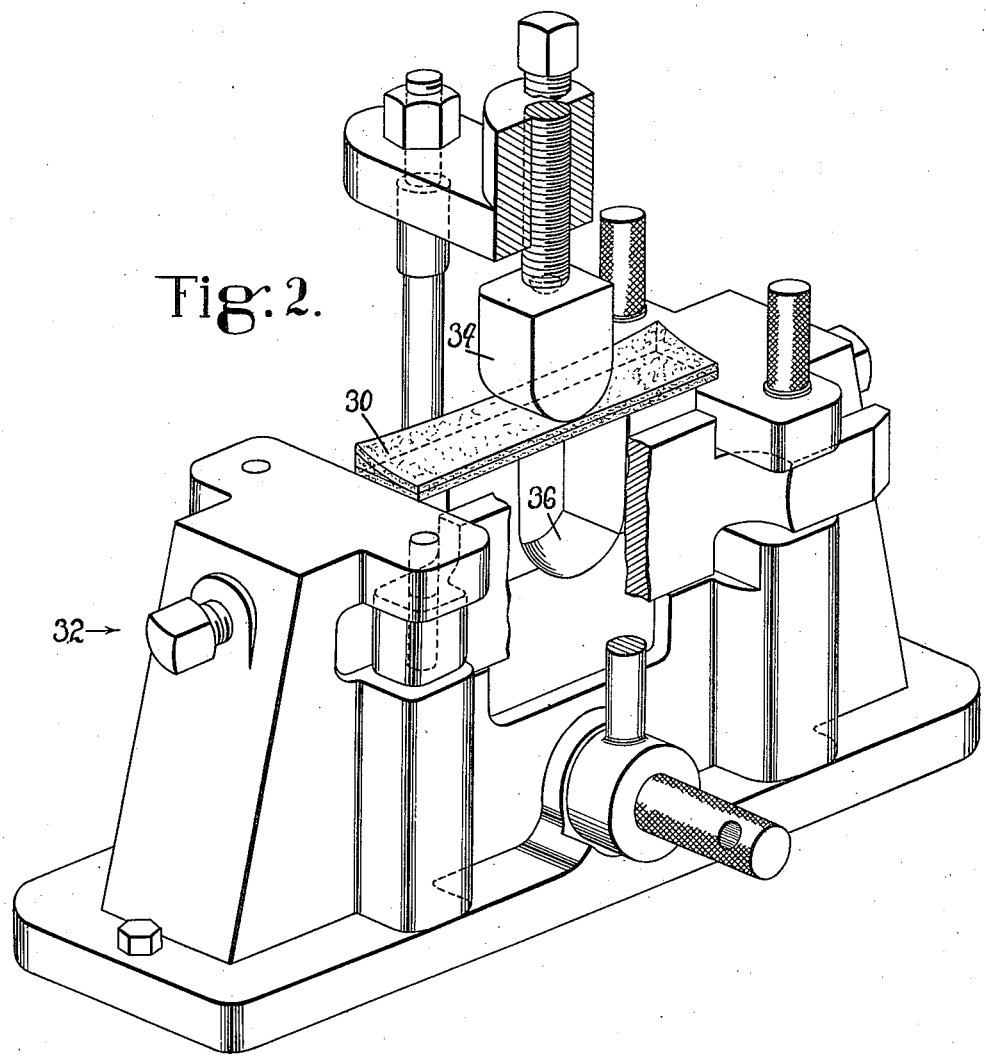
Fig. 2 is a perspective view of a mold for shaping leather heel bands, such as are used in bed lasting machines, from blanks rendered inert by the method of this invention.
Figure 3:
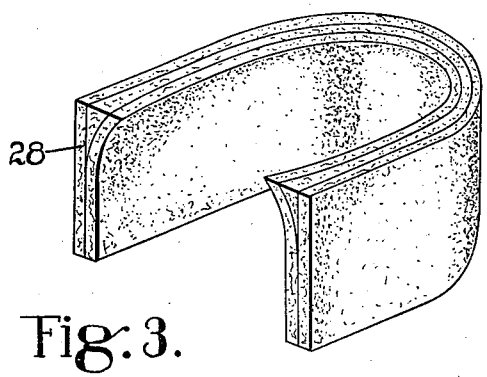
Fig. 3 is a perspective view of a heel band shaped from a blank and in a mold such as illustrated in Fig. 2.

This invention may be utilized in the shaping of, for example, heel bands such as are used in bed lasting machines, as illustrated in Figs. 2 and 3. The heel band to be formed in this application of the invention is a substantially U-shaped laminated leather member 28 of substantial thickness. The shaped member is shown in Fig. 3. The blank 30 which is to be shaped is shown in Fig. 2. In order to shape the blank according to this invention, it is rendered inert by subjecting it to a suitable vapor for 5 or 10 minutes in an apparatus such as illustrated in Fig. 1 and described above. The blank is then placed in a suitable mold 32, such as illustrated in Fig. 2, and including the punch and die members 34 and 36. While the leather is still inert the punch and die members 34 and 36 are brought into operative relationship with the blank 30 held therebetween under pressure, and such pressure may be maintained for 5 or 10 minutes, after which time the inerting vapor has been substantially completely dissipated from the leather and the leather will retain the shape imparted to it in the mold.

By the above process, leather blanks have been tempered and molded into heel bands in less than half an hour, as compared with the four or five days' time required to mold such bands by processes involving water-soaking and tempering.

Example II

Figure 4:
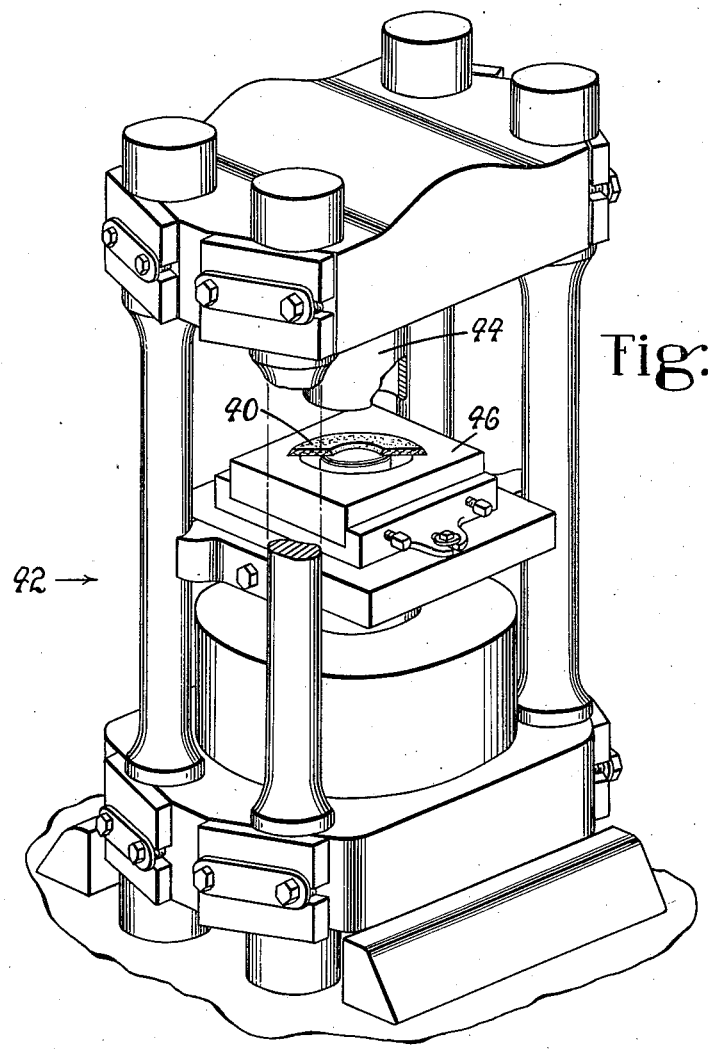
Fig. 4 is a perspective view of a mold for shaping an annular hydraulic packing of U-shaped cross-section from a leather blank treated in accordance with this invention.
Figure 5:
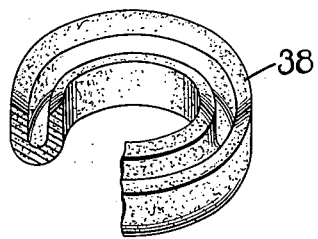
Fig. 5 is a perspective view of a hydraulic packing shaped from a blank, and by means of apparatus illustrated in Fig. 4.

Another application of this invention is to the formation of leather hydraulic packings, a form of which is illustrated at 38 in Fig. 5. The annular-shaped leather blank 40, such as shown in Fig. 4, is rendered inert by vapor in an apparatus such as illustrated in Fig. 1 and is then placed in a press 42, including the punch and die 44 and 46. After a suitable period of time, depending upon the thickness of the leather, for example 10 minutes, the shaped packing 38 may be removed from the press, at which time it may have the completed shape shown in Fig. 5. The time for holding the blank 40 in the mold is preferably sufficiently long to permit the vapor substantially to dissipate from the leather, and of course the blank 40 may be permitted to remain in the press longer if desired.

Example III

Leather readily may be embossed or plated by means of the present invention. The leather to be thus treated may be relatively light, flexible skins such as of the nature of shoe upper leather, or may be heavy, stiff leather similar to sole leather.

Figure 6:
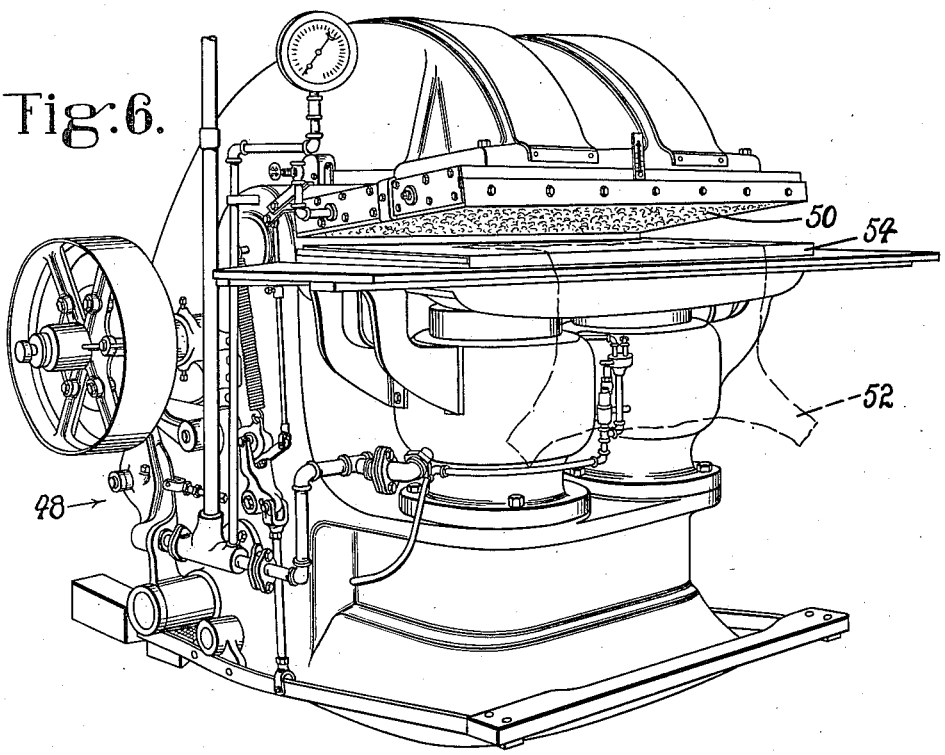
Fig. 6 is a perspective view of a press illustrating the application of this invention for embossing or ironing light leathers.
Figure 7:
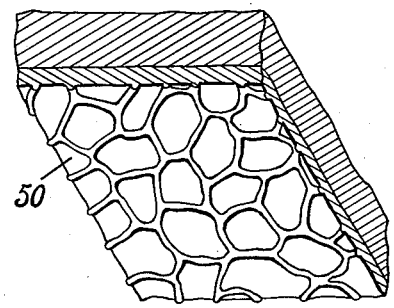
Fig. 7 is a fragmentary perspective view, partly in section, of an engraved upper platen such as may be employed with the press shown in Fig. 6 for embossing leather.

The embossing of leather may be carried out by utilizing an embossing or plating press 48, such as illustrated in Fig. 6, and employing a suitably engraved upper platen 50, such as shown in enlargement in Fig. 7. A light leather skin 52 may be rendered inert by subjecting it to suitable vapor in the manner hereinbefore described. The inerted skin 52 may then be subjected to embossing pressure between the engraved upper platen 50 and the lower platen 54 for from 2 to 5 minutes or longer, as convenience and experience may dictate. The temperature of the platens 50 and 54 may be relatively low as compared with the temperatures employed in hot-embossing processes, and in fact may be as low as room temperature.

A procedure similar to the above may be employed in providing outsoles with an embossed design or trade mark.

Figure 8:
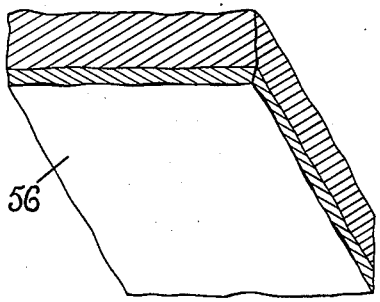
Fig. 8 is a fragmentary perspective view of a plane-surfaced upper platen which may be employed with the press shown in Fig. 6 for plating leather.

The plating of leather, usually light leather skins, may be carried out in a manner similar to that described above with respect to the embossing of skins, but by employing a plane or smooth surfaced upper platen 56 (illustrated in enlargement in Fig. 8) in place of the engraved upper platen 50.

Example IV

This invention may be utilized in conforming soles to fit lasted shoe uppers. Soles which have been rendered inert by being subjected to vapor in the manner herein described may be conformed to a standard pattern by placing the inert sole leather in conforming molds of conventional type.

Figure 9:
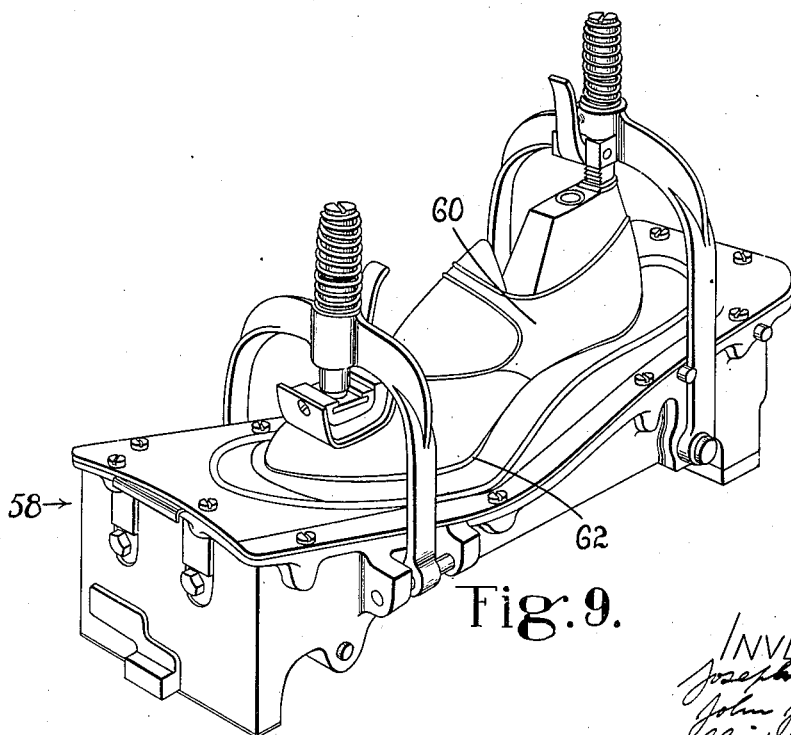
Fig. 9 is a perspective view showing a pressure device maintaining a shoe upper and outsole under pressure, and illustrating the application of this invention in the conforming of soles, and in sole attaching.

The invention makes possible further advantages in that outsoles may be readily conformed to individual shoe uppers. This may be accomplished by inerting the leather sole according to the disclosure herein and immediately placing the sole and a shoe upper under mutual pressure in a sole-attaching press, for example, such as disclosed in United States Letters Patent No. 1,897,105, granted February 14, 1933, on an application of Milton H. Ballard. In Fig. 9 is illustrated a so-called "pad box" 58 of the type disclosed in said Patent No. 1,897,105, maintaining a lasted shoe upper 60 and outsole 62 under mutual pressure. After maintaining the shoe upper and the inerted outsole under mutual pressure for 1 or 2 minutes the pressure may be released and the sole 62 will retain its exact conformity to the shoe upper 60. Thereafter, the sole may be united to the shoe upper by any suitable sole-attaching method, for example by stitching or by an adhesive.

Example V

Figure 10:
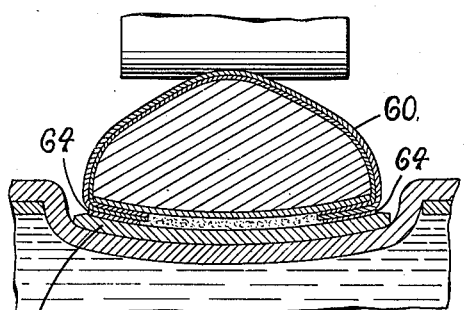
Fig. 10 is a fragmentary transverse sectional view taken through the forepart of the shoe shown in Fig. 9.

The invention has an important application in the inerting of outsoles just prior to a cement sole-attaching operation, regardless of the particular cement or adhesive employed. Thus, just prior to the placing of the cemented outsole and shoe bottom in juxtaposition and under pressure, the outsole is inerted in a manner hereinabove described. Then, while the outsole is still in inert condition, the sole and shoe upper are brought together and placed in juxtaposition in a manner such as indicated in Fig. 9. In Fig. 10 the sole 62 is shown shaped and conformed to the shoe upper 60 and adhesive 64 is shown disposed between the sole and upper.

By having the sole in inert condition at the time of the attaching operation, previous conforming or shaping of the sole is made unnecessary. Furthermore, the inerted outsole, upon the application of the sole-attaching pressure, conforms permanently to the shape of the bottom of the shoe upper, and consequently exhibits no tendency to "spring back" after the release of the sole-attaching pressure. This has the important consequences of making more certain the obtaining of sound and strong adhesive bonds between the sole and shoe upper, and, by reason of the absence of "spring back" on the part of the sole, permits release of the sole-attaching pressure and removal of the shoe from the sole-attaching press at an earlier time than usual and before the adhesive has attained substantial strength of its own. An important consequence of this latter feature is the fact that greater production is permitted with a given installation of sole-attaching devices.

Example VI

The invention furthermore lends itself to the simultaneous activating of adhesive as well as to the inerting of leather parts which are to be joined together. Such an application of the invention is in the attaching of outsoles to shoe uppers by means of an adhesive which may be activated by the inerting medium.

As a specific example, pyroxylin cement may be applied to the marginal portions of the attaching surfaces of an outsole and a shoe bottom, respectively. The outsole, and in some cases the shoe upper also, may then be inerted by a vapor consisting of or containing acetone or other solvent for pyroxylin cement. Immediately after subjecting the leather to vapor the sole and shoe upper are brought together under sole-attaching pressure, in a manner as illustrated, by way of example, in Figs. 9 and 10. A very short period of maintenance under sole-attaching pressure is sufficient, for example not over 1 minute, and in many cases as low as 10 seconds, because of the rapid dissipation of the dually functioning acetone or other inerting medium and in view of the fact that the leather of the outsole is conformed to the shape of the shoe bottom and has no tendency to spring away from the corresponding attaching surface of the shoe upper.

Example VII

Figure 11:
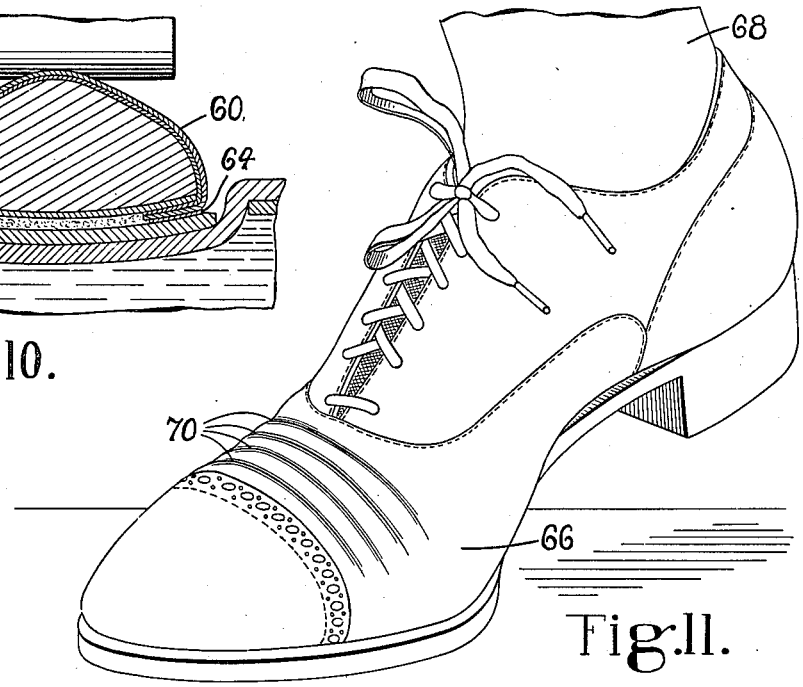
Fig. 11 is a perspective view of a shoe on a foot, illustrating the application of the invention to the "breaking in" of shoes and to the removal of stresses in shoes.

Another application of this invention is in "breaking in," and relieving stresses in, shoes. Thus, a shoe readily may be conformed to the foot of the individual purchaser by inerting the entire shoe in a manner described above, and then placing the shoe on the foot of the wearer while the leather of the shoe is still in inert condition. This feature of the invention is illustrated in Fig. 11 wherein the shoe 66 is shown on the foot 68. The shoe conforms itself immediately to the individual characteristics of the foot of the wearer and the discomfort of "breaking in" the shoe is obviated. Moreover, any stresses in the shoe resulting from shoemaking operations are relieved. Furthermore, by raising the heel while the shoe is still in inert condition, and applying creasing pressure, the creases 70 may be located permanently, and in such position as to provide the most comfort to the wearer and the longest life to the leather of the shoe upper.

Many of the advantages outlined in the preceding paragraph may be obtained by inerting the shoe in the shoe factory while on its shoemaking last, whereby any shoemaking stresses may be relieved and the shoe caused to retain in greater measure the shape of the last.

The examples which have been given above relative to the applications of this invention are merely illustrative and constitute only a few of the many possible uses thereof. The given examples, therefore, are by no means to be considered as limiting the scope of the invention.

The invention is applicable to leather-like materials as well as to leather, and generally speaking, the invention is applicable to materials which are the equivalent of leather, at least in so far as the purpose of this invention is concerned. Therefore, the term "leather," as used in the specification and claims, is intended to be construed broadly enough to include the equivalents of leather.

Having described our invention, what we claim as new and desire to secure by Letters Patent of the United States is:

1. The method of treating leather which comprises subjecting leather having a moisture content of ordinary air-dried leather to an atmosphere consisting essentially of the vapor of organic material of the group of aliphatic compounds consisting of hydrocarbons, ketones, esters, ethers and alcohols, which vapor is at a temperature at least as high as the boiling point of the organic material and not higher than 80° C. and at a pressure above barometric pressure, continuing to subject the leather to said atmosphere of vapor for a time sufficient to render the leather inert, shaping said leather, and maintaining said leather in the desired shape until the vapor has substantially dissipated from the leather.

2. The method of treating leather which comprises subjecting leather having a moisture content of ordinary air-dried leather to an atmosphere consisting essentially of the vapor of a mixture of about 61 mol. per cent of acetone and about 39 mol. per cent of methyl acetate, which vapor is at a temperature at least as high as the boiling point of the organic material and not higher than 80° C. and at a pressure above barometric pressure, continuing to subject the leather to said atmophere of vapor for a time sufficient to render the leather inert, shaping said leather, and maintaining said leather in the desired shape until the vapor has substantially dissipated from the leather.

3. The method of shaping leather which comprises subjecting leather having a moisture content of ordinary air-dried leather to an atmosphere consisting essentially of the vapor of organic material of the group of aliphatic compounds consisting of hydrocarbons, ketones, esters, ethers and alcohols, which vapor is at a temperature at least as high as the boiling point of the organic material and not higher than 80° C. and at a pressure above barometric pressure, continuing to subject the leather to said atmosphere of vapor for a time sufficient to render the leather inert, immediately thereafter placing the leather under pressure between the platens of a press, and maintaining said pressure until the vapor has substantially dissipated.

4. The method of shaping a sole to conform the sole to the attaching surface of a shoe upper which comprises subjecting said sole to an atmosphere consisting essentially of the vapor of organic material of the group of aliphatic compounds consisting of hydrocarbons, ketones, esters, ethers and alcohols, which vapor is at a temperature at least as high as the boiling point of the organic material and not higher than 80° C. and at a pressure above barometric pressure, continuing to subject the leather to said atmosphere of vapor for a time sufficient to render the leather inert, and immediately bringing said sole and shoe upper into juxtaposition and placing them under pressure, and maintaining said pressure until the vapor has substantially dissipated from the leather.

JOSEPH W. JOHNSON.
JOHN J. BROPHY.
ALEXIS E. USHAKOFF.

CERTIFICATE OF CORRECTION.

Patent No. 2,208,696. July 23, 1940.

JOSEPH W. JOHNSON, ET AL.

It is hereby certified that error appears in the printed specification of the above numbered patent requiring correction as follows: Page 4, second column, lines 53 and 54, claim 2, strike out the period after "mol"; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.